United States Patent [19]
Beatty et al.

[11] Patent Number: 5,913,052
[45] Date of Patent: Jun. 15, 1999

[54] SYSTEM AND METHOD FOR DEBUGGING DIGITAL SIGNAL PROCESSOR SOFTWARE WITH AN ARCHITECTURAL VIEW AND GENERAL PURPOSE COMPUTER EMPLOYING THE SAME

[75] Inventors: Paul E. Beatty, Leesport; Paul G. D'Arcy, North Wales; Lee E. Deschler; Mohit K. Prasad, both of Bethlehem, all of Pa.

[73] Assignee: Lucent Technologies Inc., Murray Hill, N.J.

[21] Appl. No.: 08/788,754

[22] Filed: Jan. 24, 1997

[51] Int. Cl.⁶ .................................................. G06F 9/455
[52] U.S. Cl. ............................................................ 395/500
[58] Field of Search .............................. 364/578; 395/500

[56] References Cited

U.S. PATENT DOCUMENTS

| | | | |
|---|---|---|---|
| 5,220,512 | 6/1993 | Watkins et al. | 364/488 |
| 5,325,309 | 6/1994 | Halaviati et al. | 364/488 |
| 5,623,418 | 4/1997 | Rostoker et al. | 364/488 |
| 5,680,584 | 10/1997 | Herdeg et al. | 395/500 |

*Primary Examiner*—Kevin J. Teska
*Assistant Examiner*—Ayni Mohamed

[57] ABSTRACT

A system and method, operable on a general purpose computer, for debugging software that is to control a digital signal processor ("DSP") and a general purpose computer employing either the system or the method. The present invention is employable with either a real DSP or an emulated DSP. When the DSP is emulated, the system includes: (1) architectural display circuitry that displays an architecture of a particular DSP in a window on a display of the general purpose computer, the architecture including a graphical device layout and at least one field corresponding to a register of the DSP and (2) software simulation circuitry that employs a processor of the general purpose computer to simulate operation of DSP software and emulate operation of the particular DSP to cause the particular DSP to change states over time, the architectural display circuitry updating the at least one field to reflect changes in the states, the architectural display circuitry and the software simulation circuitry cooperating to allow a user to debug the software by visually inspecting the graphical device layout and the at least one field.

40 Claims, 10 Drawing Sheets

400

SYSTEM AND METHOD FOR DEBUGGING DIGITAL SIGNAL PROCESSOR SOFTWARE WITH AN ARCHITECTURAL VIEW AND GENERAL PURPOSE COMPUTER EMPLOYING THE SAME

TECHNICAL FIELD OF THE INVENTION

The present invention is directed, in general, to computing systems and, more specifically, to a system and method for simulating the software that is to control a digital signal processor ("DSP") and a general purpose computer employing either the system or the method for simulating.

BACKGROUND OF THE INVENTION

Digital signal processing has become a mainstream technology employed by designers at the integrated circuit, board and system design levels. The technology is a core ingredient in many technology-related fields including the telecommunications and computer industries. For instance, mobile phones, modems and a myriad of related products depend on digital signal processors ("DSPs") for their basic functionality. DSPs are also effectively employed in audio, video and multimedia peripherals, disk drives and image processing systems for medical and scientific applications. As further developments in the DSP technology occur, DSPS will be advantageously employed in multitude of other applications.

First generation DSPs were highly specialized processors designed for executing various processes on digital signals such as digital computation and conversion based upon retrieval, filtering, equalization, removal of noise or echoes, modulation, Fourier transformations, extraction of the characteristic parameter of a signal, prediction and picture emphasis. The designs were characterized by pipelining arrangements for high speed arithmetic, memory, access and input/output ("I/O") functions. In addition to the capabilities previously mentioned, the DSPs now include general purpose hardware capabilities that, in combination with application programs, provide enhanced system functionality such as real-time control, communication with other processors, memory management and I/O management. For instance, a DSP may operate as a co-processor together with a general purpose microprocessor as the host.

In short, DSPs are basically microcomputers designed to perform specific signal processing tasks under software control. Thus, a high degree of the functionality of the DSP is entrusted to the applications software program. Consequently, an applications developer or programmer (in general, "user") is presented with several challenges regarding the analysis and debugging of the software. The challenges are due to the fact that the user is not only designing a signal processing system, but is also writing software.

Software debugging is not a trivial process. The process includes several tasks, such as ensuring that the software cycles correctly on the DSP. Additionally, the signal processing of the DSP, via an ad hoc and empirical measure of performance, must be periodically verified. Several errors may be detected as a result of the software debugging and signal analysis process including a fundamental error in the signal processing algorithm, a data error in the coefficients, parameters or constants or a software bug. An analysis of signals entering and exiting the DSP are important in determining the source of any error in the operation of the DSP.

Moreover, a conventional DSP software debugging process provides a view of the state of the registers and memory of the machine as the operation of the DSP is emulated and a software applications program (i.e., the software under test) is simulated thereon. The process of simulating the applications program on the emulated DSP generally occurs on a computer system such as a personal computer. Conventionally, the values of the registers and memory of the machine are textually displayed on the display of the personal computer such that a user may examine the values as the program is being operated on the emulated DSP. In a sense, the debugging is a brute force process where the user pictures in his mind the state of the machine that correlates with the operation of the machine at a particular stage and throughout the application of the program. The user, then, compares the picture in mind with the textual information provided and makes adjustments to the code, if necessary.

Of course, this brute force evaluation of the state of the machine in connection with the application program running on the emulated DSP is a very arduous task for the user. Additionally, a DSP provides a high level parallel processing capability thereby adding to the complexity of the debugging process. So, not only must the user be concerned with the states of the machine, but the throughput of the machine must be concurrently evaluated. In other words, the user must simultaneously evaluate if the applications program is driving the machine to its fullest potential to achieve the highest level of efficiency.

Accordingly, what is needed in the art is a more efficient way of debugging DSP software, such that development of the program logic is faster and more reliable. Further, what is needed in the art is a way of presenting information about the DSP logic to a user to allow the user to utilize DSP resources most effectively.

SUMMARY OF THE INVENTION

To address the above-discussed deficiencies of the prior art, the present invention provides a system and method, operable on a general purpose computer, for debugging software that is to control a DSP and a general purpose computer employing either the system or the method. The present invention is employable with either a real DSP or an emulated DSP. When the DSP is emulated, the system includes: (1) architectural display circuitry that displays an architecture of a particular DSP in a window on a display of the general purpose computer, the architecture including a graphical device layout and at least one field corresponding to a register of the DSP and (2) software simulation circuitry that employs a processor of the general purpose computer to simulate operation of DSP software and emulate operation of the particular DSP to cause the particular DSP to change states over time, the architectural display circuitry updating the at least one field to reflect changes in the states, the architectural display circuitry and the software simulation circuitry cooperating to allow a user to debug the software by visually inspecting the graphical device layout and the at least one field.

The present invention therefore introduces, in one embodiment thereof, a combined DSP hardware emulator and software simulator that provides a user an enhanced understanding of DSP states, allowing the user to assess whether the software is functioning as intended. The system is designed for flexibility: the particular DSP may be changed without having to provide additional hardware, and the field(s) corresponding to a register (or multiple registers) of the DSP are preferably user-configurable. In the embodiment of the present invention that operates with a real DSP, detailed information concerning the states can be correlated with the graphical device layout to afford the user a comprehensive understanding of the execution of the DSP software.

Although the terms are sometimes used interchangeably in the art, "emulation" and "simulation" are given different meanings for purposes of the present invention. "Emulation" is an imitation or modeling of the hardware, while "simulation" is execution of software in the emulated hardware.

Alternatively, the system of the present invention may include an interface between a processor of the general purpose computer and a real (non-emulated) DSP. In this alternative embodiment, the general purpose computer causes the DSP software to execute within the real DSP, in turn causing the real DSP to change states over time. The general purpose computer monitors the states allowing the architectural display circuitry to update at least one field to reflect changes in the states.

In an alternative embodiment of the present invention, the system further comprises an architecture database, storable on a storage device of the general purpose computer, that contains a plurality of user-selectable architectures corresponding to a plurality of DSPs, the system thereby allowing the user to select the particular DSP from the database. The present invention therefore can accommodate multiple DSP architectures that the user can recall at will. Additionally, the present invention allows one or more of the user-selectable architectures correspond to DSPs that do not even exist. This gives the user the unique advantage of being able to develop DSP software for a DSP that has not yet been produced. Consequently, introduction of DSP hardware and software can coincide.

In an alternative embodiment of the present invention, the system further comprises source software display circuitry that displays a source code representation of the DSP software in a further window on the display of the general purpose computer to allow the user to debug the software by visually inspecting the graphical device layout, the at least one field and the source code representation. Those skilled in the art are familiar with source code representations employed in more familiar interactive debuggers. The present invention can take advantage of such representations to aid the user in debugging DSP software.

In an alternative embodiment of the present invention, the system further comprises object software display circuitry that displays an object code representation of the DSP software in a further window on the display of the general purpose computer to allow the user to debug the software by visually inspecting the graphical device layout, the at least one field and the object code representation. Likewise, those skilled in the art are familiar with object code representations employed in more familiar interactive debuggers. As with source code representations, the present invention can take advantage of object code representations to aid the user in debugging DSP software.

In an alternative embodiment of the present invention, the system further comprises breakpoint circuitry that allows the user to establish at least one breakpoint for interrupting the operation of the DSP software. Breakpoints allow the user to predefine pausing points, permitting the user to examine DSP states at the breakpoints. Those skilled in the art will recognize, however, that the broad scope of the present invention is not so limited to including breakpoint circuitry.

In an alternative embodiment of the present invention, the architectural display circuitry allows the user to specify a level of detail regarding the graphical device layout to be displayed in the window. The level of detail may be had by zooming in or out or may be had by displaying more or less DSP architecture detail, depending upon the user's wishes.

In an alternative embodiment of the present invention, the architectural display circuitry and the software simulation circuitry are embodied in a sequence of instructions executable on the processor of the general purpose computer. Alternatively, the present invention may be embodied in dedicated or hardwired discrete or integrated circuitry.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
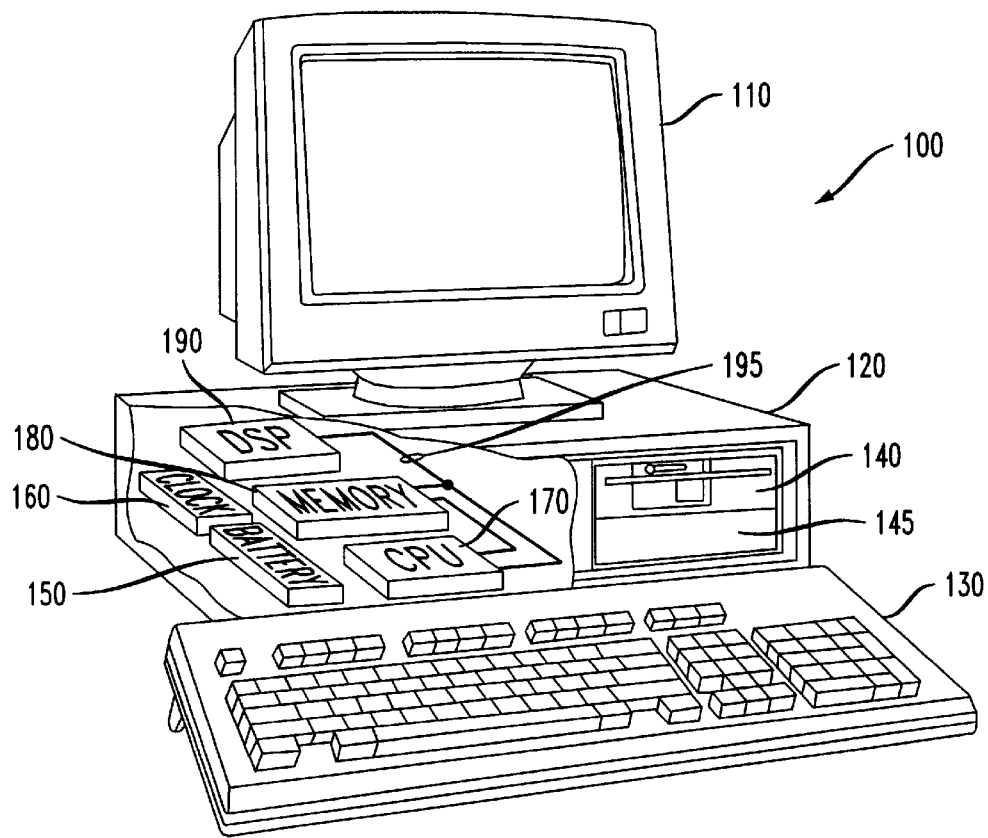
FIG. 1 illustrates an isometric view of an embodiment of a programmable general purpose computer constructed according to the principles of the present invention.

Referring initially to FIG. 1, illustrated is an isometric view of an embodiment of a programmable general purpose computer 100 constructed according to the principles of the present invention. The computer 100 is presented as a general purpose computer capable of storing and executing a sequence of instructions to yield a combined DSP hardware emulator and DSP software simulator that provides a user an enhanced understanding of DSP states, allowing the user to assess whether the software is functioning as intended. Since the present invention is not limited to application in a general purpose computer environment, however, FIG. 1 is presented only for illustrative purposes.

The computer 100 includes a monitor or display 110, a chassis 120 and a keyboard 130. The monitor 110 and the keyboard 130 cooperate to allow communication (e.g., via a graphical user interface, or "GUI") between the computer 100 and the user. Alternatively, the monitor 110 and keyboard 130 may be replaced by other conventional output input devices, respectively. The chassis 120 includes both a floppy disk drive 140 and hard disk drive 145. The floppy disk drive 140 is employed to receive, read and write to removable disks; the hard disk drive 145 is employed for fast access storage and retrieval, typically to a nonremovable disk. The floppy disk drive 140 may be replaced by or combined with other conventional structures to receive and transmit data and instructions, including without limitation, tape and compact disc drives, telephony systems and devices (including videophone, paging and facsimile technologies), and serial and parallel ports.

The chassis 120 is illustrated having a cut-away portion that includes a battery 150, clock 160, processor 170 (e.g., Sun Microsystems Sparc 20 as manufactured by Sun Microsystems, Inc. of Mountain View, Calif.) and memory 180. Although the computer 100 is illustrated having a single processor 170, hard disk drive 145 and memory 180, the computer 100 may be equipped with a plurality of processors and peripheral devices.

It should be noted that any conventional computer system having at least one processor that is suitable to function as a general purpose computer may replace, or be used in conjunction with, the computer 100, including, without limitation: hand-held, laptop/notebook, mini, mainframe and supercomputers, including RISC and parallel processing architectures, as well as within computer system/network combinations. Alternative computer system embodiments may be firmware-or hardware-based.

Before undertaking more detailed discussions of advantageous embodiments of the present invention, the meaning of the following terms and phrases should be understood: the term "or" is inclusive, meaning and/or; the terms "include," "includes" or "including" mean inclusion without limitation; the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like; and the phrase "memory map" and derivatives thereof may mean a method by which a computer translates between logical and physical address space, and vise versa.

Figure 2:
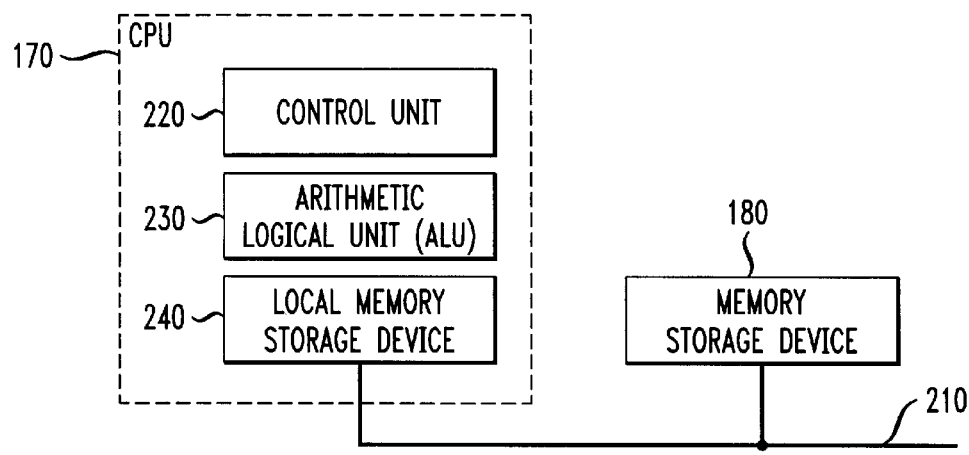
FIG. 2 illustrates a block diagram of an embodiment of the processor associated with the general purpose computer of FIG. 1.

Turning now to FIG. 2, illustrated is a block diagram of an embodiment of the processor 170 associated with the general purpose computer 100 of FIG. 1. The processor 170 is coupled to the memory 180 by a data bus 210. The memory 180 generally stores data and instructions that the processor 170 uses to execute the functions necessary to operate the computer 100. The memory 180 may be any conventional memory storage device. The processor 170 includes a control unit 220, arithmetic logic unit ("ALU") 230 and local memory 240 (e.g., stackable cache or a plurality of registers). The control unit 220 fetches the instructions from memory 180. The ALU 230, in turn, performs a plurality of operations, including addition and boolean AND, necessary to carry out the instructions fetched from the memory 180. The local memory 240 provides a local high speed storage location for storing temporary results and control information generated and employed by the ALU 230.

In alternate advantageous embodiments, the processor 170 may, in whole or in part, be replaced by or combined with any suitable processing configuration, including multi and parallel processing configurations, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted also that while the processor 170 includes the bus configuration as illustrated, alternate configurations are well within the broad scope of the present invention. Furthermore, conventional computer system architecture is more fully discussed in *The Indispensable PC Hardware Book,* by Hans-Peter Messmer, Addison Wesley (2nd ed. 1995) and *Computer Organization and Architecture,* by William Stallings, MacMillan Publishing Co. (3rd ed. 1993); conventional computer, or communications, network design is more fully discussed in *Data Network Design,* by Darren L. Spohn, McGraw-Hill, Inc. (1993) and conventional data communications is more fully discussed in *Voice and Data Communications Handbook,* by Bud Bates and Donald Gregory, McGraw-Hill, Inc. (1996), *Data Communications Principles,* by R. D. Gitlin, J. F. Hayes and S. B. Weinstein, Plenum Press (1992) and *The Irwin Handbook of Telecommunications,* by James Harry Green, Irwin Professional Publishing (2nd ed. 1992). Each of the foregoing publications is incorporated herein by reference for all purposes.

In one embodiment of the present invention, the system for simulating software that is to control a DSP operates as follows. The memory 180 stores a plurality of user-selectable architectures corresponding to a plurality of DSPs in a database associated therewith. The display 110, coupled to the memory 180, displays an architecture of a particular DSP selected from the database in a window on the display 110; the architecture includes a graphical device layout and at least one field corresponding to a register of the DSP. The processor 170, coupled to the display 110, simulates operation of the DSP software and emulates operation of the particular DSP to cause the particular DSP to change states over time. The processor 170 controls the display 110 to update the at least one field to reflect changes in the states to allow the user to debug the software by visually inspecting the graphical device layout and the at least one field.

Alternatively, the system of the present invention may include an interface 195 and a real (non-emulated) DSP 190 associated with the computer 100. In this alternative, the processor 170 causes the DSP software to execute within the real DSP 190, in turn causing the real DSP 190 to change states over time. The processor 170 controls the display 110 to update at least one field of the real DSP 190 to reflect changes in the states to allow the user to debug the software by visually inspecting the graphical device layout and the at least one field.

Figure 3:
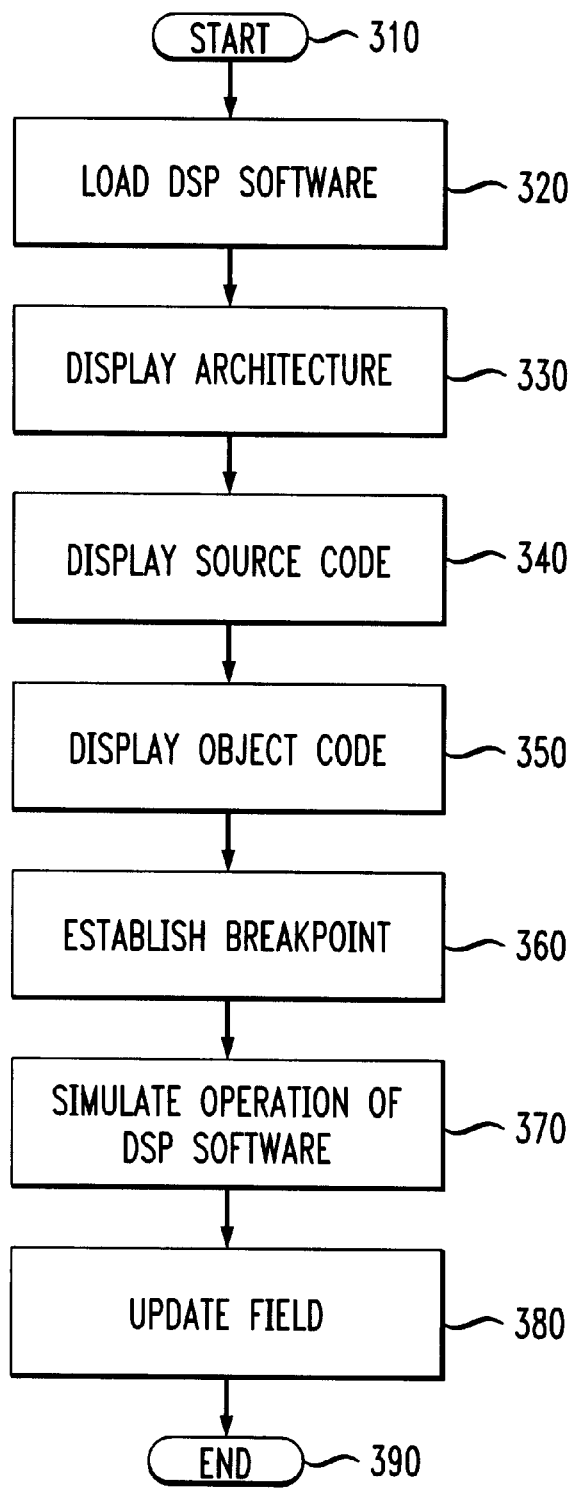
FIG. 3 illustrates an embodiment of a method, performable on a general purpose computer, of simulating software that is to control a DSP.

Turning now to FIG. 3, illustrated is an embodiment of a method, performable on a general purpose computer (such as that illustrated in FIG. 1), of simulating software that is to control a DSP. The method commences at a start step 310. The software is loaded into the computer in a load DSP software step 320. An architecture of a particular DSP is displayed in a window on a display of the computer during a display architecture step 330. The architecture includes a graphical device layout and at least one field corresponding to a register of the DSP. A source code representation of the DSP software is displayed in a further window on the display of the computer during a display source code step 340. The source code representation allows the user to debug the software by visually inspecting the graphical device layout, the at least one field and the source code representation.

Concurrently, an object code representation of the DSP software is displayed in a further window on the display of the computer during a display object code step 350. The object code representation allows the user to debug the software by visually inspecting the graphical device layout, the at least one field and the object code representation. In an establish breakpoint step 360, the user establishes at least one breakpoint for interrupting the operation of the DSP software. A processor of the computer is employed to simulate operation of the DSP software and emulate operation of the particular DSP to cause the particular DSP to change states over time during a simulate operation of DSP software step 370. In the present embodiment, at each breakpoint the at least one field is updated to reflect changes in the states to allow a user to debug the software by visually inspecting the graphical device layout and the at least one field during an update field step 380. The previously described steps are repeated until the software is meticulously debugged. The method concludes at an end step 390.

Figure 4:
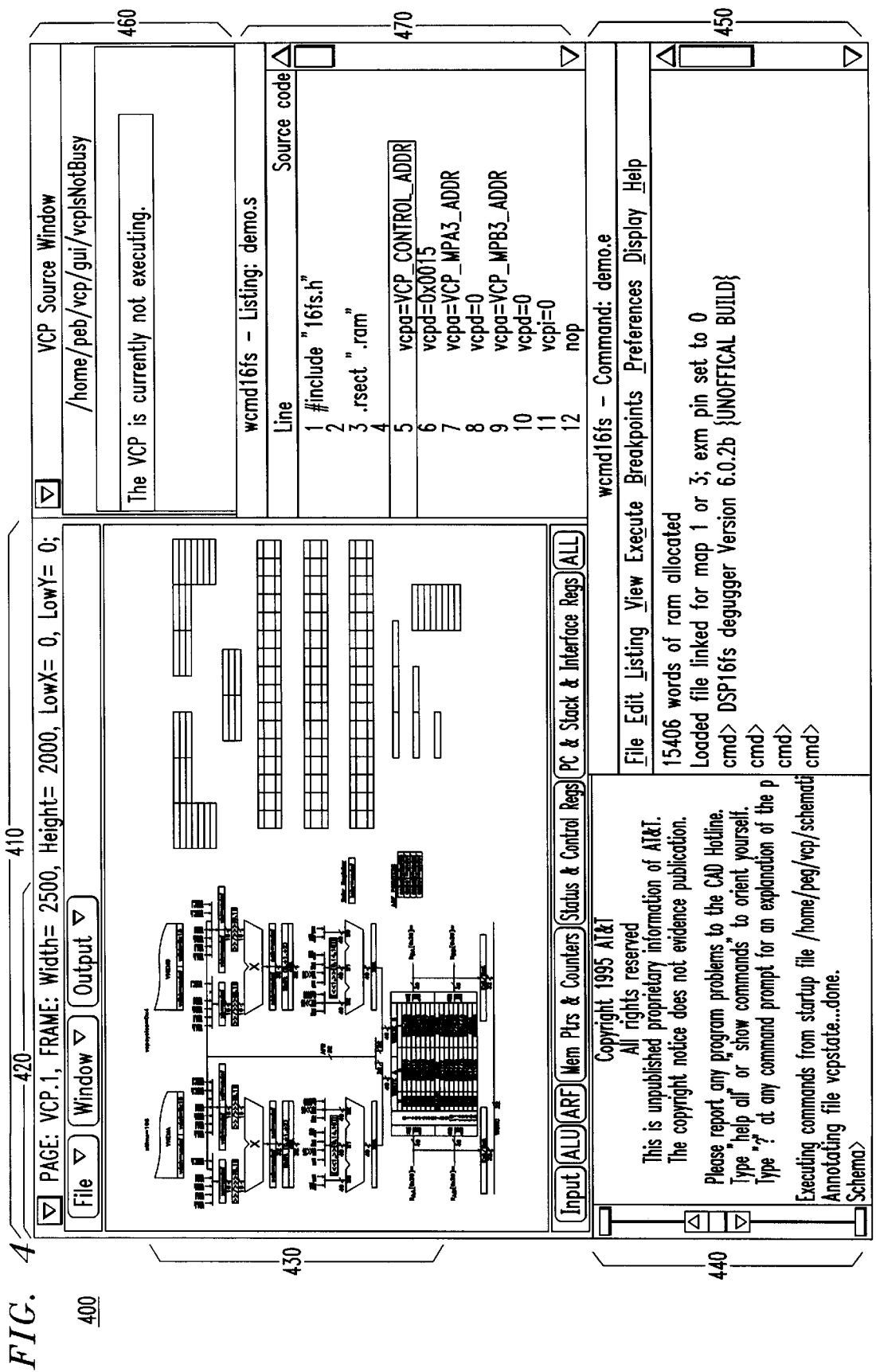
FIG. 4 illustrates an embodiment of a display for a general purpose computer constructed according to the principles of the present invention.

Turning now to FIG. 4, illustrated is an embodiment of a display 400 for a general purpose computer constructed according to the principles of the present invention. The display 400 includes an architectural window 410 that displays an architectural view of a particular DSP. The architecture view includes a graphical device layout 420 (sometimes referred to as a "DSP pipeline") and at least one field corresponding to a register 430 of the DSP. The particular DSP is set in an initial state and consequently the parameters and registers in the architectural view are undefined. The display 400 also includes a debugging statement window 440 that displays the debugging statements corresponding to the architectural view. The display 400 also includes a debugging textural interface window 450 that displays an interface to the tools for debugging the DSP.

The display 400 further includes a source window 460 that displays a source code representation of the DSP software to allow the user to debug the software by visually inspecting the graphical device layout 420, the at least one field 430 and the source code representation. The display still further includes another source code window 470 for a second and controlling DSP that is not illustrated in the architectural window 410. Of course, the display 400 may also include an object window (not shown in the illustrated embodiment) that displays an object code representation of the DSP software to further assist the user to debug the software.

In a representative embodiment of the present invention, the system for simulating software that is to control the DSP operates as follows. Architectural display circuitry displays the architecture of the particular DSP in the architectural window 410 including the graphical device layout 420 and the at least one field corresponding to a register 430 of the DSP. The system includes software simulation circuitry that employs a processor of the computer to simulate operation of the DSP software and emulate operation of the particular DSP to cause the particular DSP to change states over time. The architectural display circuitry updates the at least one field 430 to reflect changes in the states. The architectural display circuitry and the software simulation circuitry cooperate to allow the user to debug the software by visually inspecting the graphical device layout 420 and the at least one field 430. The architectural display circuitry also allows the user to specify a level of detail regarding the graphical device layout 420 to be displayed. The system further includes an architecture database, storable on a storage device or memory of the computer, that contains a plurality of user-selectable architectures corresponding to a plurality of DSPs; the system thereby allows the user to select the particular DSP from the database. The system further includes source software display circuitry that displays the source code representation of the DSP software as discussed above. The system still further includes breakpoint circuitry that allows the user to establish at least one breakpoint for interrupting the operation of the DSP software.

A processor and memory of the general purpose computer cooperate to form the architectural display circuitry, software simulation circuitry, software execution circuitry, source software display circuitry, object software display circuitry, breakpoint circuitry and architectural database as described above. The architectural display circuitry, software simulation circuitry, software execution circuitry, source software display circuitry, object software display circuitry and breakpoint circuitry may also be embodied in a sequence of instructions executable on the processor of the general purpose computer. Thus, the present invention may be embodied in software, dedicated or hardwired discrete or integrated circuitry, or combinations thereof.

Turning sequentially to FIGS. 5 to 11, illustrated is a simulation of the DSP software that is to control a particular DSP according to the principles of the present invention. Again, the present invention introduces a combined DSP hardware emulator and software simulator that provides a user an enhanced understanding of DSP states, thereby allowing the user to assess whether the software is functioning as intended. The simulation of the DSP software will hereinafter be described employing the display 400 illustrated and described with respect to FIG. 4. Table I below lists a source code representation of the DSP software simulated on the particular DSP. The source code representation is displayed in the source window 460.

TABLE I

| SOURCE CODE | COMMENTS |
|---|---|
| vda.1=*mpa3++2 | load vda.1 registers with value of memory at address mpa3; increment mpa3 by 2 |
| vc0=vda.1 | initialize counter vc0 to vda. 1 |
| vapbe0=0x0f00 | initialize pointer, base, end registers |
| alua va0=0, alub val=0 | initialize accumulators 0 & 1 to 0 |
| alua va2=0, alub va3=0 | initialize accumulators 2 & 3 to 0 |
| alua va4=0, alub va5=0 | initialize accumulators 4 & 5 to 0 |
| alua va6=0, alub va7=0 | initialize accumulators 6 & 7 to 0 |
| alua va8=0, alub va9=0 | initialize accumulators 8 & 9 to 0 |
| alua va10=0, alub va11=0 | initialize accumulators 10 & 11 to 0 |
| alua va12=0, alub va13=0 | initialize accumulators 0 & 12 to 13 |
| alua va14=0, alub va15=0 | initialize accumulators 14 & 15 to 0 |
| vda=*mpa3++2, vdb=*mpb3++2 | load data from memory into vda, vdb |
| xa=vda.h, ya.0=vdb.h, xb=vda.1, yb.0=vdb.1, vda=*mpa3++2, vdb=*mpb3++2 | load x, y registers on both sides while also loading the memory registers |
| pa=xa*ya.h, pb=xb*yb.h | compute first product |
| loop: if vc0ge goto loop: alua *vap0++=*vap0+pa+pb, | all at the same time, accumulate a sum in arf, |
| pa=xa*ya.h, pb=xb*yb.h, xa=vda.h, ya.0=vdb.h, xb=vda.1, yb.0=vdb.1, vda=*mpa3++2, vdb=*mpb3++2 | calculate next product, load x and y registers, and load memory registers in both pipes |
| end: alua *vap0++=*vap0+pa+pb | calculate last sum |

Figure 5:
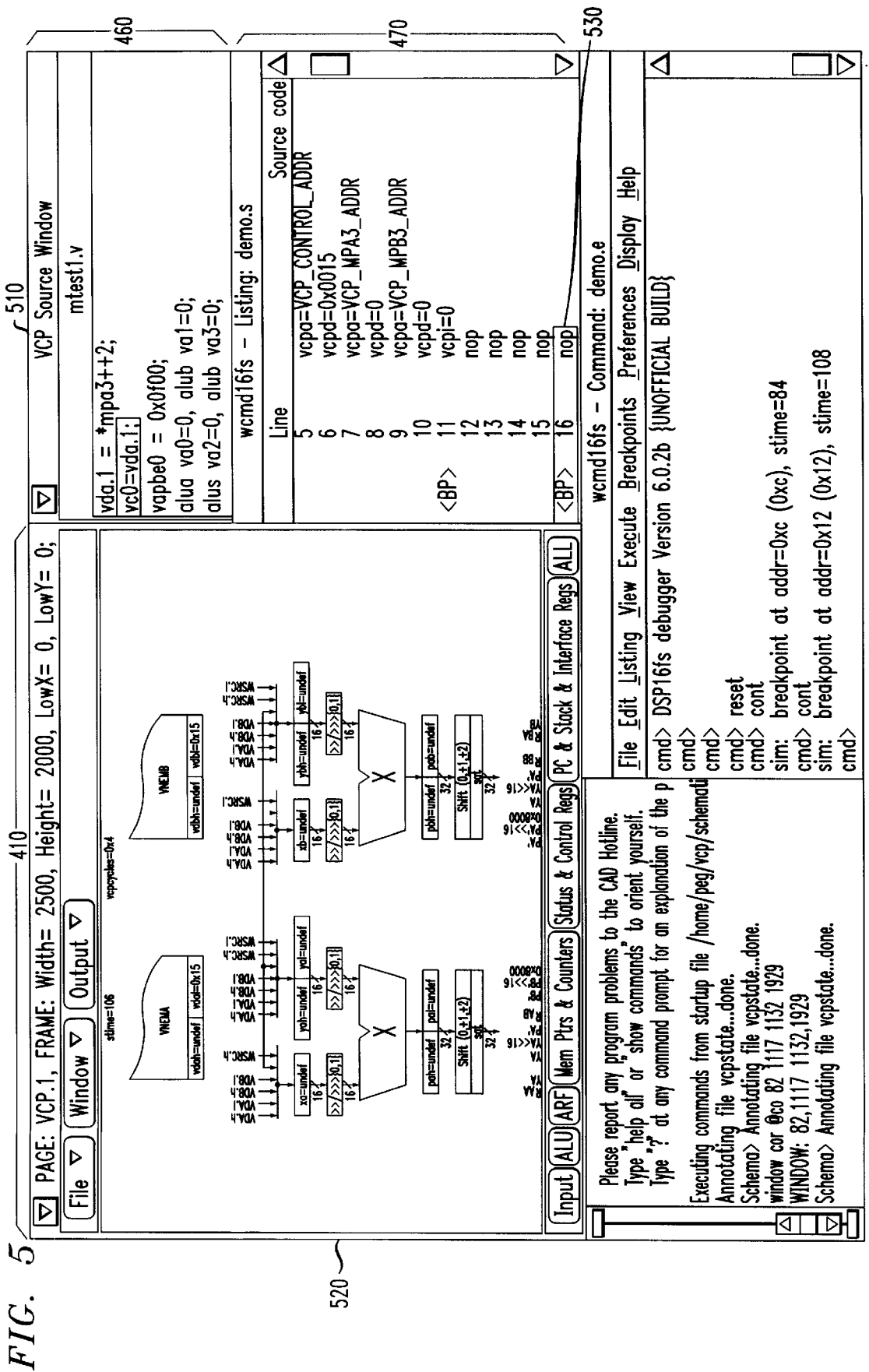
FIGS. 5 to 11 illustrate a simulation of DSP software that is to control a particular DSP according to the principles of the present invention.

With specific reference to FIG. 5, the system (as described with respect to FIG. 4) has performed one instruction and a subsequent instruction (denoted by a first highlighted instruction 510) is ready to be executed. As represented in a higher resolution illustration of the architectural window 410, a value (indicated in a memory block 520 of the DSP pipeline) is now displayed for "vda.1" resulting from the execution of the initial instruction. A breakpoint (denoted by a first highlighted term 530) for interrupting the operation of the DSP software is illustrated in the source window 470.

Figure 6:
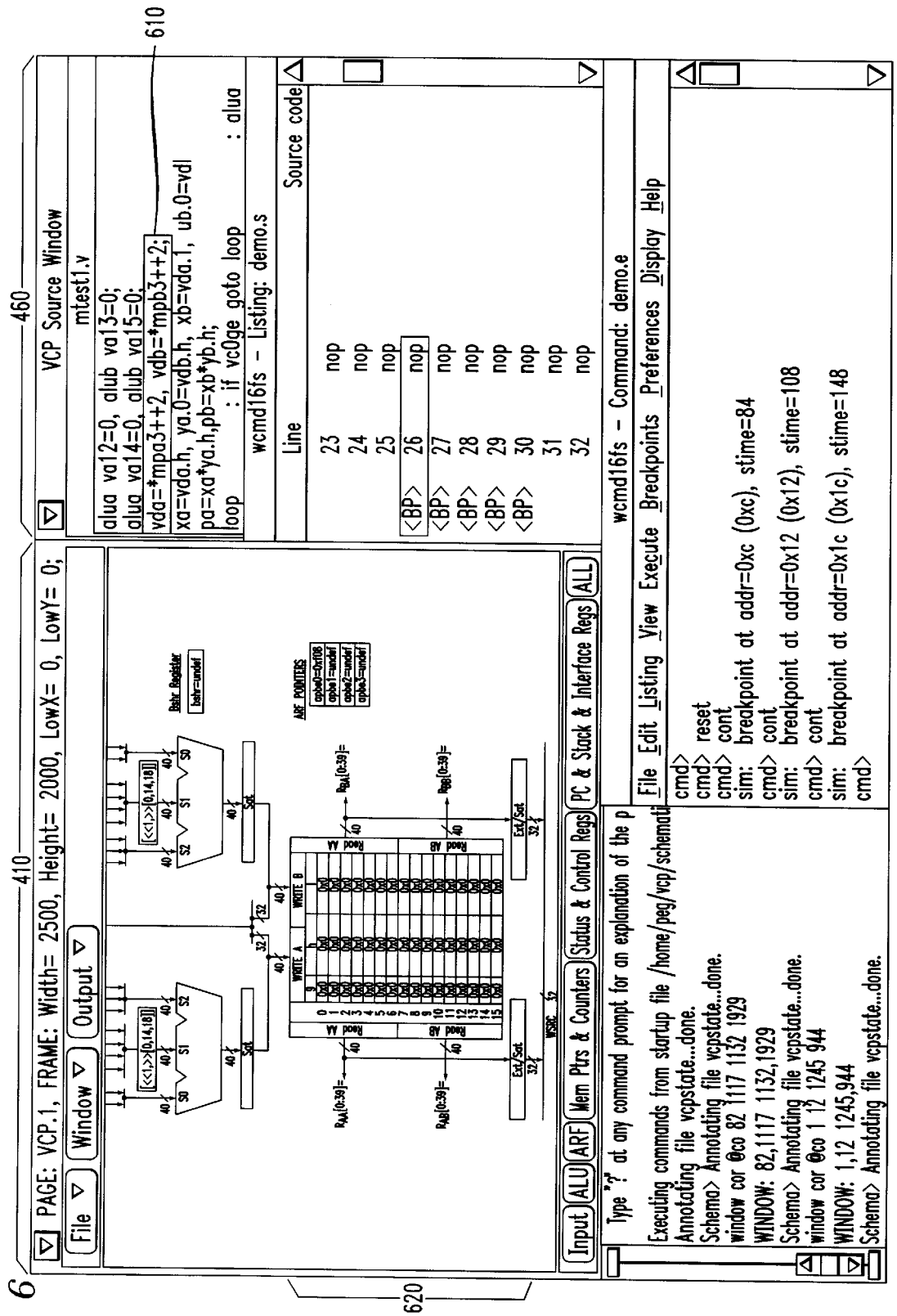

With specific reference to FIG. 6, the system has performed all of the instructions up to the next ready instruction (denoted by a second highlighted instruction 610). As represented in another higher resolution illustration of the architectural window 410, all of the corresponding states of the registers in the DSP pipeline have been updated including the accumulator registers 620 being initialized to zero.

Figure 7:
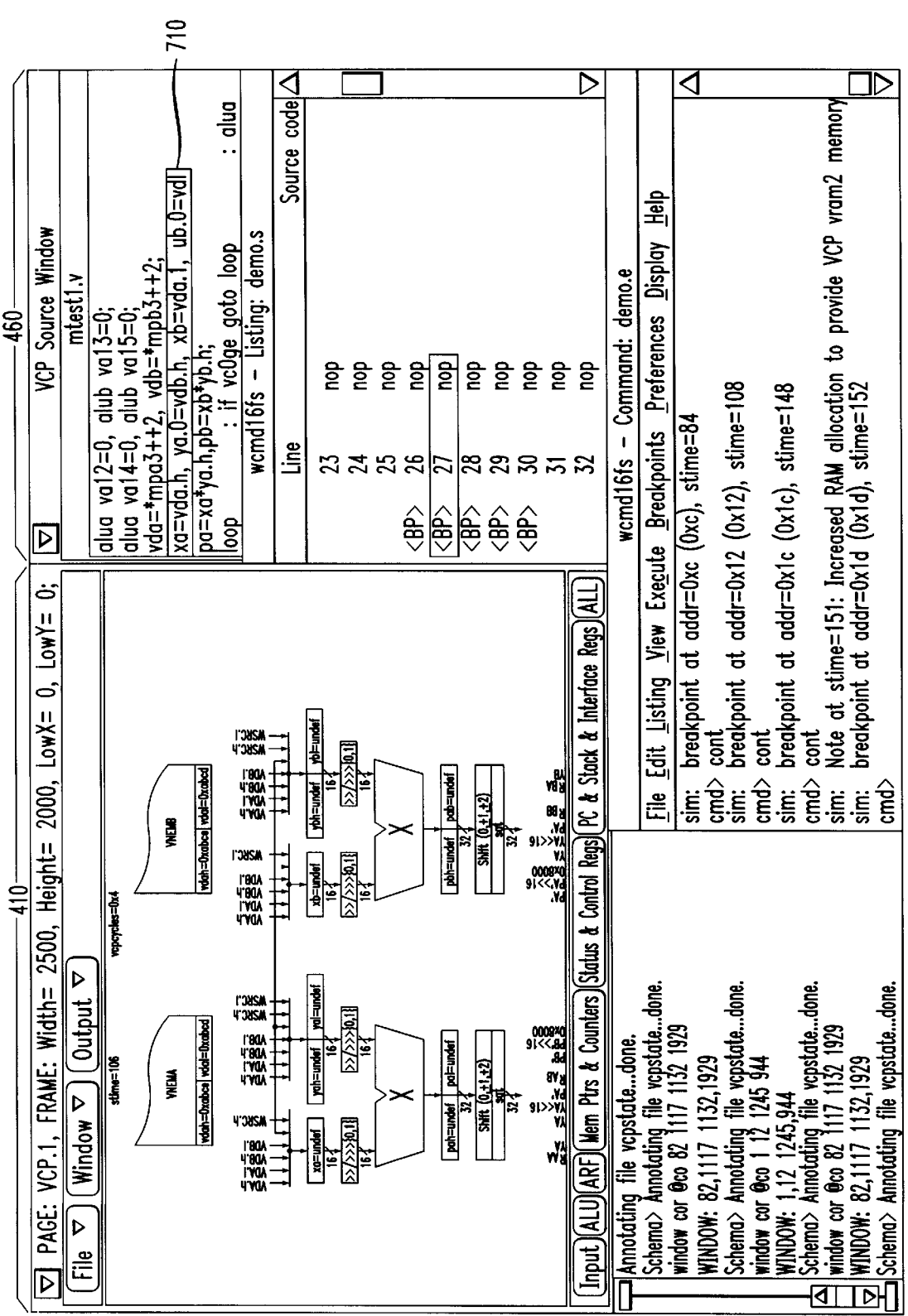

With specific reference to FIG. 7, the system has performed all of the instructions up to the next ready instruction (denoted by a third highlighted instruction 710). The previous instruction loaded the vda and vdb registers from the memory. The third highlighted instruction 710 will load the x and y registers in conjunction with loading the vda and vdb registers once again. The instructions are performed in parallel. As represented in another higher resolution illustration of the architectural window 410, all of the corresponding states of the registers in the DSP pipeline have been updated to represent the latest instructions.

Figure 8:
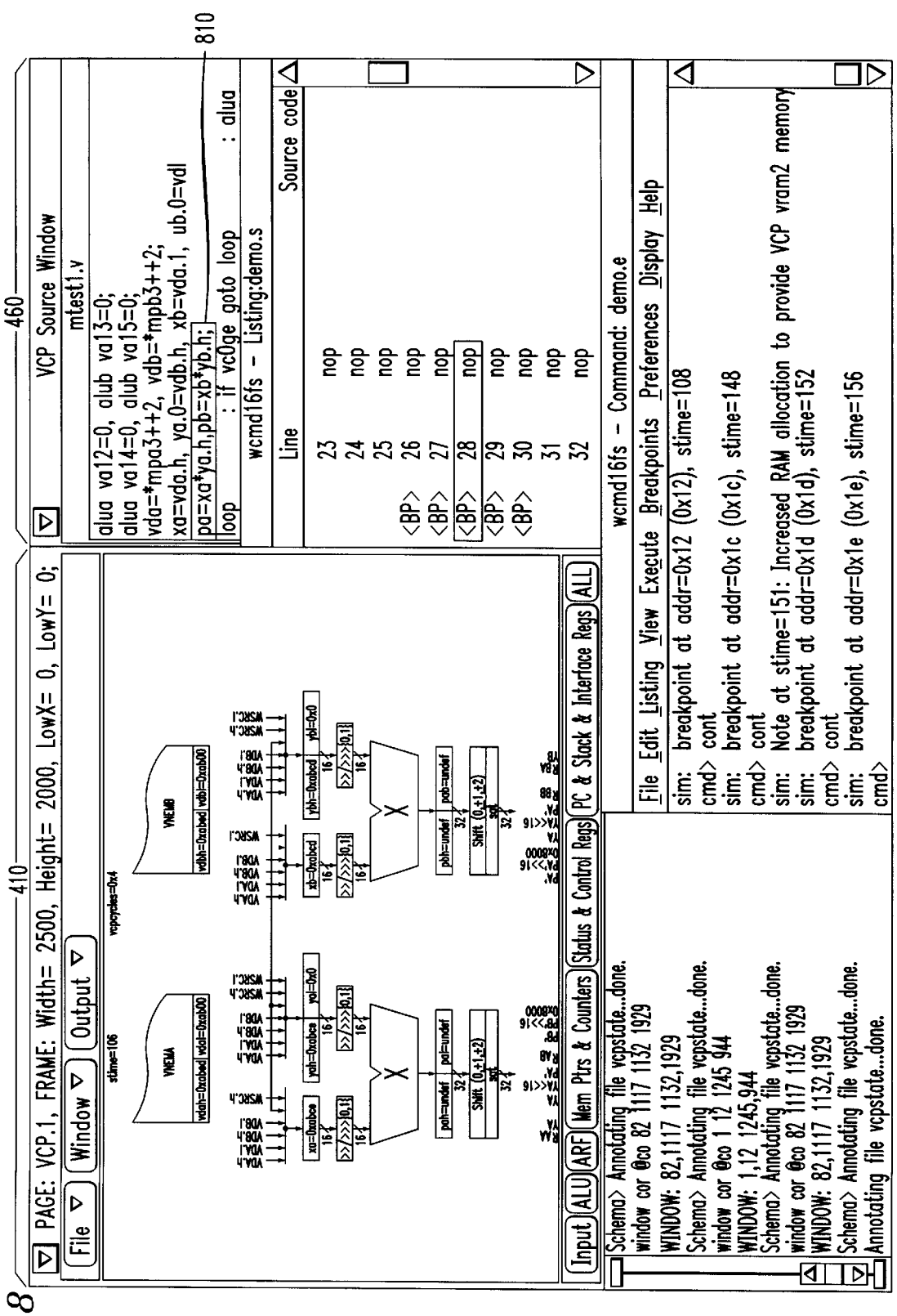

With specific reference to FIG. 8, the system has performed all of the instructions up to the next ready instruction (denoted by a fourth highlighted instruction 810). The previous instruction loaded the xa, ya, xb, yb, vda and vdb registers from the memory. The fourth highlighted instruction 810 will compute the first products of the respective registers. As represented in another higher resolution illustration of the architectural window 410, all of the corresponding states of the registers in the DSP pipeline have been updated to represent the latest instructions.

Figure 9:
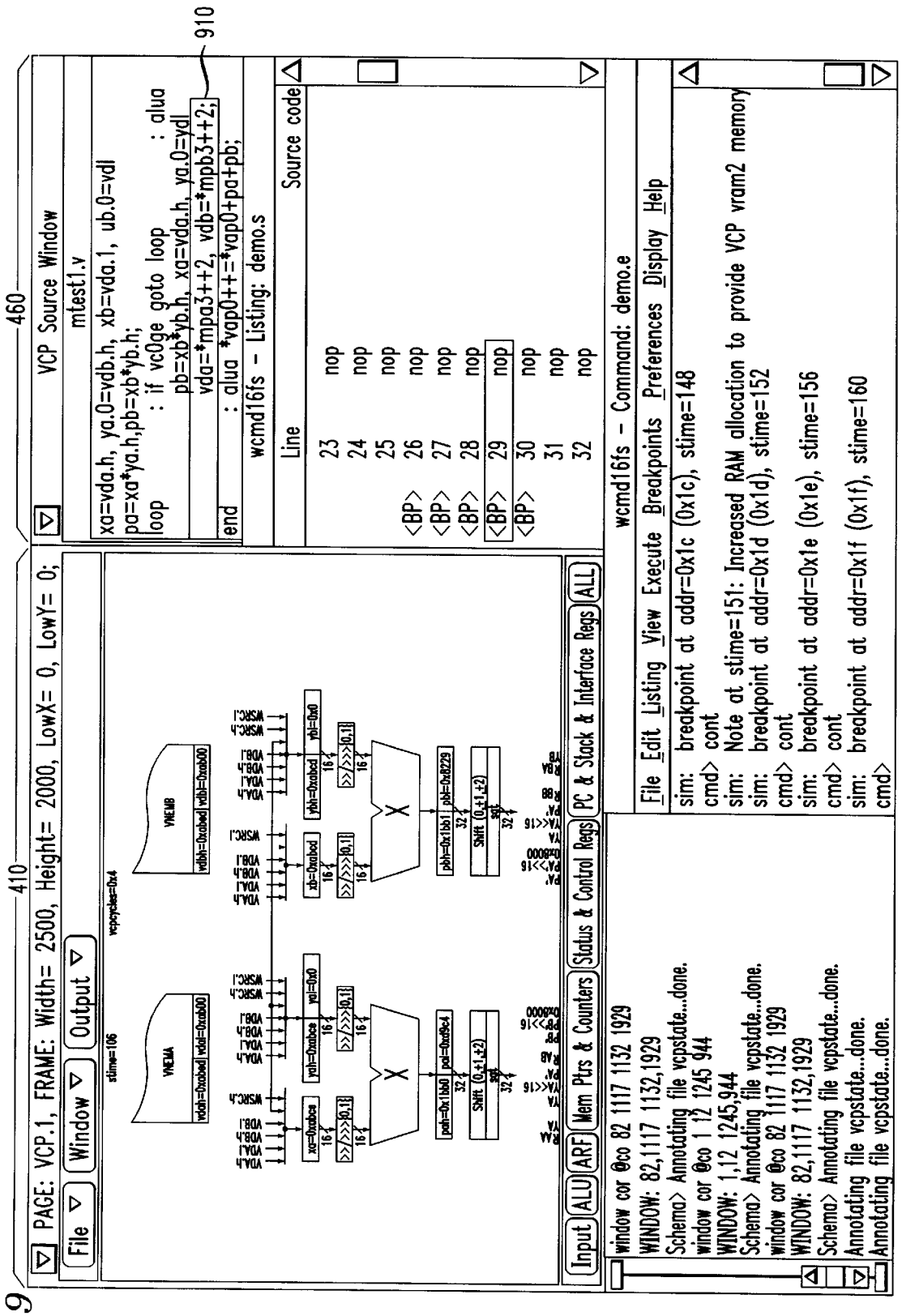

With specific reference to FIG. 9, the system has performed all of the instructions up to the next ready instruction (denoted by a fifth highlighted instruction 910). The previous instruction computed the first products introduced with respect to FIG. 8. As represented in another higher resolution illustration of the architectural window 410, all of the corresponding states of the registers in the DSP pipeline have been updated to represent the latest instructions.

Figure 10:
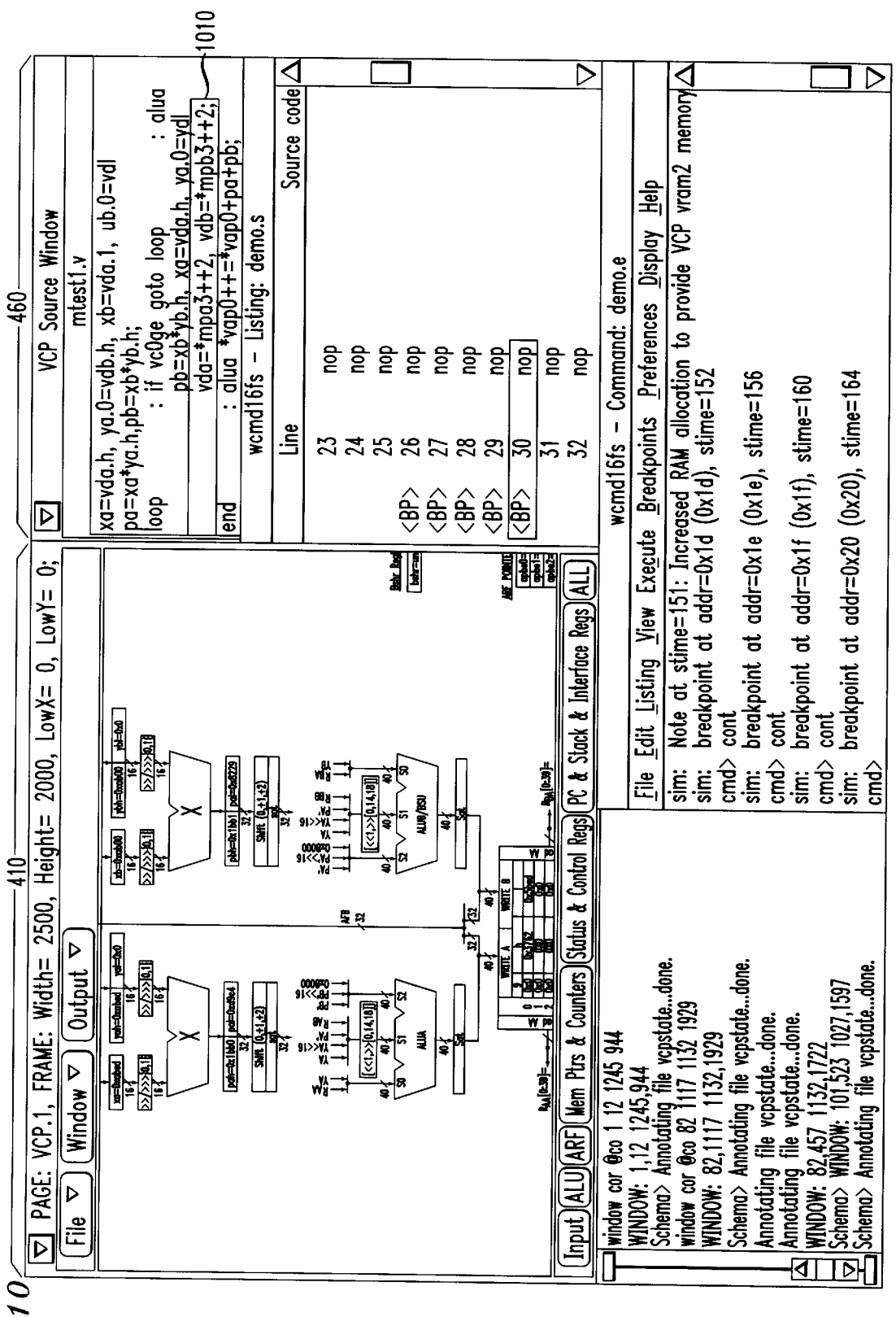

With specific reference to FIG. 10, the system has performed all of the instructions up to and including the next ready instruction (denoted by a sixth highlighted instruction 1010). The sixth highlighted instruction 1010 has added the previous values of pa and pb and placed the result in the va0 register, computed new products in the first and second column of the DSP pipeline, loaded both sets of the x and y registers from the previous values of vda and vdb, and read the next value in memory into the vda and vdb registers. As represented in another higher resolution illustration of the architectural window 410, all of the corresponding states of the registers in the DSP pipeline have been updated to represent the latest instructions.

Figure 11:
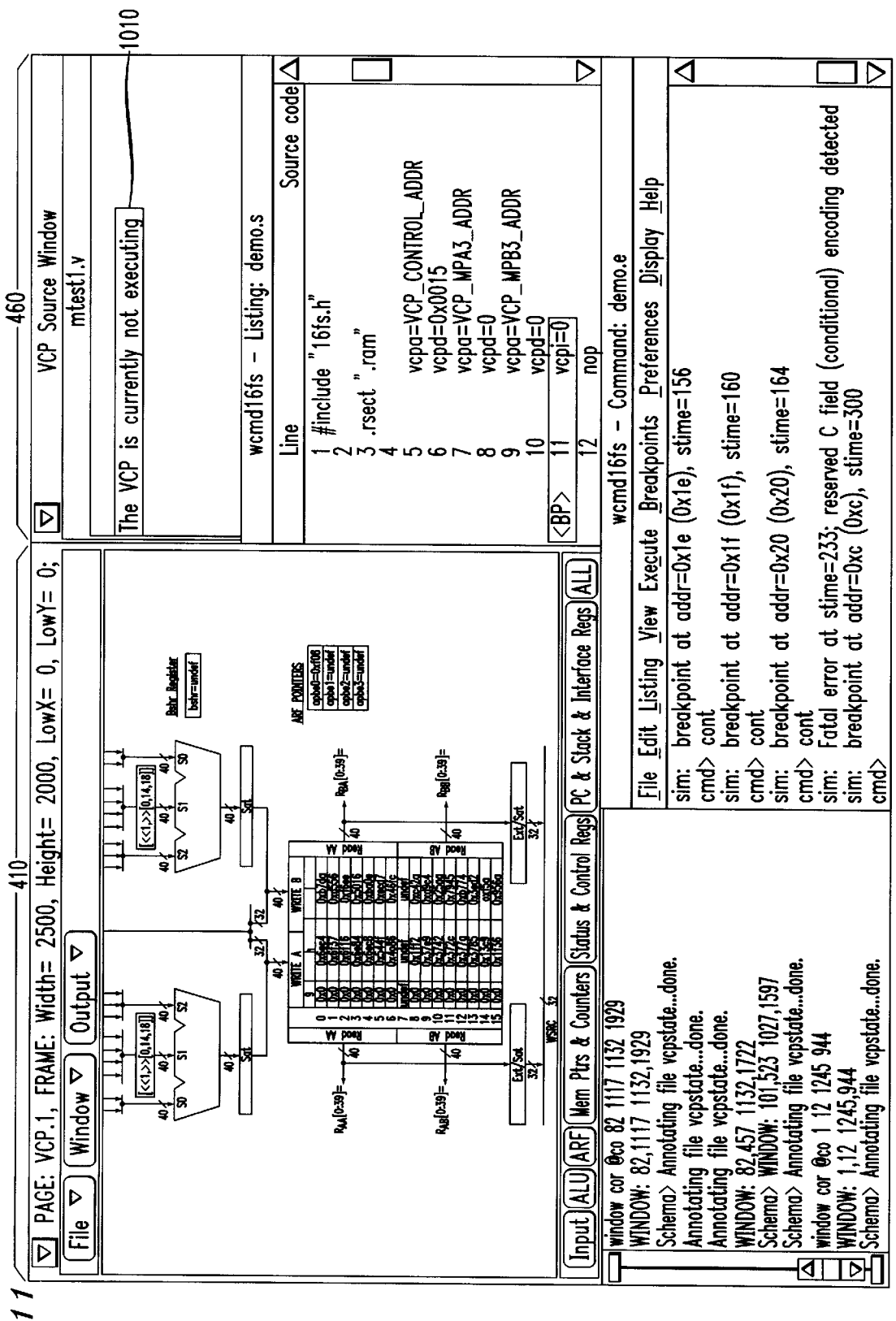

With specific reference to FIG. 11, the system has performed all of the instructions and the program is currently not executing (denoted by a seventh highlighted instruction 1110). The final instructions of the program computed additional sums and stored the values into the accumulators of the DSP pipeline. As represented in another higher resolution illustration of the architectural window 410, all of the corresponding states of the registers in the DSP pipeline have been updated to represent the remaining instructions.

The previously described simulation of the DSP software to control a particular DSP is presented for illustrative purposes only. Any system capable of allowing a user to debug the DSP software by visually inspecting the graphical device layout and at least one field thereof is well within the broad scope of the present invention. Furthermore, the present invention may operate on more than one DSP at the same time.

For a better understanding of DSPs see *VLSI Digital Signal Processors*, by Vijay K. Madisetti, Butterworth-Heinemann (1995). The aforementioned reference is herein incorporated by reference.

Although the present invention has been described in detail, those skilled in the art should understand that they can make various changes, substitutions and alterations herein without departing from the spirit and scope of the invention in its broadest form.

What is claimed is:

1. A system, operable on a general purpose computer, for simulating software that is to control a digital signal processor (DSP), comprising:

architectural display circuitry that displays an architecture of a particular DSP in a window on a display of said general purpose computer, said architecture including a graphical device layout and at least one field corresponding to a register of said DSP; and software simulation circuitry that employs a processor of said general purpose computer to simulate operation of DSP software and emulate operation of said particular DSP to cause said particular DSP to change states over time, said architectural display circuitry updating said at least one field to reflect changes in said states, said architectural display circuitry and said software simulation circuitry cooperating to allow a user to debug said software by visually inspecting said graphical device layout and said at least one field.

2. The system as recited in claim 1 further comprising an architecture database, storable on a storage device of said general purpose computer, that contains a plurality of user-selectable architectures corresponding to a plurality of DSPs, said system thereby allowing said user to select said particular DSP from said database.

3. The system as recited in claim 1 further comprising source software display circuitry that displays a source code representation of said DSP software in a separate window on said display of said general purpose computer to allow said user to debug said software by visually inspecting said graphical device layout, said at least one field and said source code representation.

4. The system as recited in claim 1 further comprising object software display circuitry that displays an object code representation of said DSP software in a separate window on said display of said general purpose computer to allow said user to debug said software by visually inspecting said graphical device layout, said at least one field and said object code representation.

5. The system as recited in claim 1 further comprising breakpoint circuitry that allows said user to establish at least one breakpoint for interrupting said operation of said DSP software.

6. The system as recited in claim 1 wherein said architectural display circuitry allows said user to specify a level of detail regarding said graphical device layout to be displayed in said window.

7. The system as recited in claim 1 wherein said architectural display circuitry and said software simulation circuitry are embodied in a sequence of instructions executable on said processor of said general purpose computer.

8. A method, performable on a general purpose computer, of simulating software that is to control a digital signal processor (DSP), comprising the steps of:

displaying an architecture of a particular DSP in a window on a display of said general purpose computer, said architecture including a graphical device layout and at least one field corresponding to a register of said DSP;

employing a processor of said general purpose computer to simulate operation of DSP software and emulate operation of said particular DSP to cause said particular DSP to change states over time; and updating said at least one field to reflect changes in said states to allow a user to debug said software by visually inspecting said graphical device layout and said at least one field.

9. The method as recited in claim 8 further comprising the step of containing a plurality of user-selectable architectures corresponding to a plurality of DSPs in a database, said system thereby allowing said user to select said particular DSP from said database.

10. The method as recited in claim 8 further comprising the step of displaying a source code representation of said DSP software in a separate window on said display of said general purpose computer to allow said user to debug said software by visually inspecting said graphical device layout, said at least one field and said source code representation.

11. The method as recited in claim 8 further comprising the step of displaying an object code representation of said DSP software in a separate window on said display of said general purpose computer to allow said user to debug said software by visually inspecting said graphical device layout, said at least one field and said object code representation.

12. The method as recited in claim 8 further comprising the step of allowing said user to establish at least one breakpoint for interrupting said operation of said DSP software.

13. The method as recited in claim 8 wherein said architectural display circuitry allows said user to specify a level of detail regarding said graphical device layout to be displayed in said window.

14. The method as recited in claim 8 wherein said steps of displaying, employing and updating are performed by executing a sequence of instructions on said processor of said general purpose computer.

15. A programmable general purpose computer, comprising:

a memory that stores a plurality of user-selectable architectures corresponding to a plurality of digital signal processors (DSPs) in a database;

a display, coupled to said memory, that displays an architecture of a particular DSP selected from said database in a window on said display, said architecture including a graphical device layout and at least one field corresponding to a register of said DSP;

a processor, coupled to said display, that simulates operation of DSP software and emulates operation of said particular DSP to cause said particular DSP to change states over time, said processor controlling said display to update said at least one field to reflect changes in said states to allow a user to debug said software by visually inspecting said graphical device layout and said at least one field.

16. The computer as recited in claim 15 wherein said user is allowed to select said particular DSP from said database.

17. The computer as recited in claim 15 wherein said processor controls said display to display a source code representation of said DSP software in a separate window on said display of said general purpose computer to allow said user to debug said software by visually inspecting said graphical device layout, said at least one field and said source code representation.

18. The computer as recited in claim 15 wherein said processor controls said display to display an object code representation of said DSP software in a separate window on said display of said general purpose computer to allow said user to debug said software by visually inspecting said graphical device layout, said at least one field and said object code representation.

19. The computer as recited in claim 15 wherein said processor allows said user to establish at least one breakpoint for interrupting said operation of said DSP software.

20. The computer as recited in claim 15 wherein said processor allows said user to specify a level of detail regarding said graphical device layout to be displayed in said window.

21. A system, operable on a general purpose computer, for controlling a digital signal processor (DSP), comprising:

architectural display circuitry that displays an architecture of a particular DSP in a window on a display of said general purpose computer, said architecture including a graphical device layout and at least one field corresponding to a register of said DSP; and software execution circuitry that communicates with a DSP via an interface of said general purpose computer to execute DSP software on said particular DSP to cause said particular DSP to change states over time, said architectural display circuitry updating said at least one field to reflect changes in said states, said architectural display circuitry and said software execution circuitry cooperating to allow a user to debug said software by visually inspecting said graphical device layout and said at least one field.

22. The system as recited in claim 21 further comprising an architecture database, storable on a storage device of said general purpose computer, that contains a plurality of user-selectable architectures corresponding to a plurality of DSPs.

23. The system as recited in claim 21 further comprising source software display circuitry that displays a source code representation of said DSP software in a separate window on said display of said general purpose computer to allow said user to debug said software by visually inspecting said graphical device layout, said at least one field and said source code representation.

24. The system as recited in claim 21 further comprising object software display circuitry that displays an object code representation of said DSP software in a separate window on said display of said general purpose computer to allow said user to debug said software by visually inspecting said graphical device layout, said at least one field and said object code representation.

25. The system as recited in claim 1 further comprising breakpoint circuitry that allows said user to establish at least one breakpoint for interrupting said operation of said DSP software.

26. The system as recited in claim 21 wherein said architectural display circuitry allows said user to specify a level of detail regarding said graphical device layout to be displayed in said window.

27. The system as recited in claim 21 wherein said architectural display circuitry and said software execution circuitry are embodied in a sequence of instructions executable on said processor of said general purpose computer.

28. A method, performable on a general purpose computer, of controlling a digital signal processor (DSP), comprising the steps of:

displaying an architecture of a particular DSP in a window on a display of said general purpose computer, said architecture including a graphical device layout and at least one field corresponding to a register of said DSP;

communicating with a DSP via an interface of said general purpose computer to execute DSP software on said particular DSP to cause said particular DSP to change states over time; and updating said at least one field to reflect changes in said states to allow a user to debug said software by visually inspecting said graphical device layout and said at least one field.

29. The method as recited in claim 28 further comprising the step of containing a plurality of user-selectable architectures corresponding to a plurality of DSPs in a database.

30. The method as recited in claim 28 further comprising the step of displaying a source code representation of said DSP software in a separate window on said display of said general purpose computer to allow said user to debug said software by visually inspecting said graphical device layout, said at least one field and said source code representation.

31. The method as recited in claim 28 further comprising the step of displaying an object code representation of said DSP software in a separate window on said display of said general purpose computer to allow said user to debug said software by visually inspecting said graphical device layout, said at least one field and said object code representation.

32. The method as recited in claim 28 further comprising the step of allowing said user to establish at least one breakpoint for interrupting said operation of said DSP software.

33. The method as recited in claim 28 wherein said architectural display circuitry allows said user to specify a level of detail regarding said graphical device layout to be displayed in said window.

34. The method as recited in claim 28 wherein said steps of displaying, communicating and updating are performed by executing a sequence of instructions on said processor of said general purpose computer.

35. A programmable general purpose computer, comprising:

a memory that stores a plurality of user-selectable architectures corresponding to a plurality of digital signal processors (DSPs) in a database;

a display, coupled to said memory, that displays an architecture of a particular DSP selected from said database in a window on said display, said architecture including a graphical device layout and at least one field corresponding to a register of said DSP; and a processor, coupled to said display, that communicates with a DSP via an interface of said general purpose computer to execute DSP software on said particular DSP to cause said particular DSP to change states over time, said processor controlling said display to update said at least one field to reflect changes in said states to allow a user to debug said software by visually inspecting said graphical device layout and said at least one field.

36. The computer as recited in claim 35 wherein said interface circuitry is adapted to be coupled to a selected one of a plurality of DSPs.

37. The computer as recited in claim 35 wherein said processor controls said display to display a source code representation of said DSP software in a separate window on said display of said general purpose computer to allow said user to debug said software by visually inspecting said graphical device layout, said at least one field and said source code representation.

38. The computer as recited in claim 35 wherein said processor controls said display to display an object code representation of said DSP software in a separate window on said display of said general purpose computer to allow said user to debug said software by visually inspecting said graphical device layout, said at least one field and said object code representation.

39. The computer as recited in claim 35 wherein said processor allows said user to establish at least one breakpoint for interrupting said operation of said DSP software.

40. The computer as recited in claim 35 wherein said processor allows said user to specify a level of detail regarding said graphical device layout to be displayed in said window.

* * * * *